INVENTORS.
KENNETH L. PERKINS
RICHARD L. PALMER
BY JOHN S. AUSMAN

AGENT

United States Patent Office 3,005,348
Patented Oct. 24, 1961

3,005,348
VERTICAL VELOCITY MEASURING SYSTEM
Kenneth L. Perkins, Anaheim, Richard R. Palmer, La Mirada, and John S. Ausman, Garden Grove, Calif., assignors to North American Aviation, Inc.
Filed Oct. 7, 1958, Ser. No. 766,175
8 Claims. (Cl. 73—503)

This invention relates to inertial measuring systems and more particularly to a vertical velocity system having altimeter correction.

In many of today's weapon systems it has become imperative that an accurate bombing system allowing extreme deviations from the straight and level approach path be developed. One of the important bomb trajectory parameters required by such a system is the vertical velocity. The vertical velocity information which is fed into the fire computer system of the bomber must be up to date (negligible lag time) and of minimum error in order to avoid appreciably affecting the bombing accuracy.

Inertial instruments such as accelerometers produce signals proportional to acceleration, velocity or distance as measured in the direction of the sensitive axis of the instrument. The signal produced by the accelerometer may be directly proportional to acceleration, or if integrated either internally or externally once or twice, may be proportional to velocity or distance respectively. A typical vertical velocity device uses the integrated output of an inertial type of accelerometer to determine the vertical velocity of the aircraft. In airplanes which include autonavigation equipment having a stabilized platform, it is common to mount the vertical velocity system on the stable platform so that the vertical velocity output may be free of inertial forces contributed by accelerations along directions other than those selected.

Present day inertially stabilized vertical velocity systems provide measurements of vertical velocity which are either too inaccurate or lag too far behind the true vertical velocity to be useful in a fast maneuvering bomber. One method being presently utilized employs a barometric device to measure the vertical velocity in terms of the rate of change of static pressure. Due to the fact that the measurements must be based on a standard atmosphere measurement figure, additional error is introduced due to the inherent inaccuracies in the atmosphere standard. Results obtained from a device of this nature are inadequate for contemplated present day bombing systems. A second method employed utilizes radar by making use of the well known doppler effect. In addition to the undesirability of such a radar system because it is a radiating device, the accuracy to which vertical velocity can be determined is dependent upon the flatness of the terrain. Terrain variations are such as to make the system unsatisfactory for determining vertical velocity to the accuracy required for a low level tactical bombing mission.

The device of this invention overcomes the aforestated disadvantages of present vertical velocity measuring systems by utilizing the corrected output of a fast-response, inertial-type accelerometer combined with altitude information from an independent source in a continuous manner so as to correct the output of the accelerometer.

In accordance with the disclosed embodiment of the invention, a stabilized inertial accelerometer is provided for measuring the vertical acceleration of an object such as an aircraft in air. Integrating means are provided to be responsive to the output signal of the vertical accelerometer device to obtain a vertical velocity and an altitude signal. An altimeter is provided to obtain a second altitude signal, and the first and second altitude signals are combined in a computer to provide correction signals which are fed back to the input of the vertical accelerometer. A vertical velocity measuring system is thus provided which utilizes simple components to enable the device to maintain a high mechanization accuracy and also to provide corrections to the system providing a highly accurate output at all times.

More particularly an integrator is provided to integrate the velocity output of the velocity device or to doubly integrate the acceleration output of the accelerometer to provide a first altitude signal. An altimeter is provided for obtaining a second altitude signal. A summing means is provided for obtaining a signal proportional to the difference between the first and second altitude signals and means are provided for obtaining a signal proportional to the derivative of said difference signal. Means for producing a first correction signal proportional to said first altitude signal times a constant determined by the earth's gravitational effect are provided and means for producing a second correctional signal proportional to said derivative signal times a constant and means for producting a third corrective signal proportional to said difference signal times a constant are also provided. These corrective signals are combined to provide a feedback signal to the vertical accelerometer thereby correcting the integrated output (vertical velocity) of the device at all times.

It is therefore an object of this invention to provide an improved vertical velocity measuring system.

It is another object of this invention to effect continuous correction of a vertical velocity system.

It is still another object of this invention to provide an improved inertial accelerometer.

It is a further object of this invention to provide a stabilized feedback correction system for an inertial velocity measuring device.

It is a still further object of this invention to provide independent altimeter means for correcting the vertical velocity output of an inertial accelerometer system.

These and other objects of this invention will become apparent from the following description taken in connection with the accompanying drawings in which.

Figure 1:
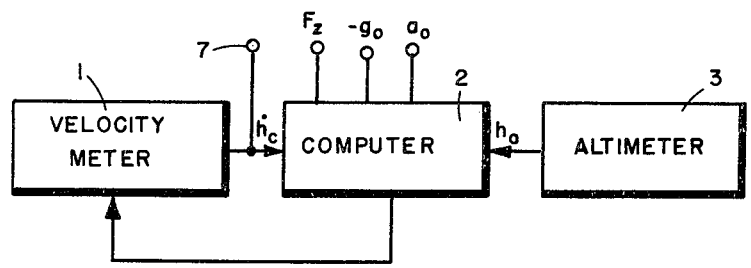
FIG. 1 is a block diagram illustrating the principles of the invention.

As illustrated in FIG. 1, velocity meter 1, which is an inertial instrument commonly known as an integrating accelerometer, is mounted on a stabilized platform such as is found in present-day inertial autonavigator guidance systems. Velocity meter 1 provides an output $\dot{h}_c$ at terminal 7 which is proportional to the computed vertical velocity of the aircraft in a coordinate system determined by the guidance system therein. The $\dot{h}_c$ output of velocity meter 1 is fed as one of the inputs into computer 2. Computer 2 also receives a signal $h_a$ proportional to the altitude of the aircraft as determined by altimeter 3. Altimeter 3 may be a barometric or a radar altimeter such as are commonly found in aircraft. Computer 2 combines the altitude signal from velocity meter 1 and the altitude signal from altimeter 3 along with the signals $F_z$, $g_0$, and $a_0$, obtained from aircraft instruments not a part of this invention, and provides a correction signal which is fed from the computer back to the input of velocity meter 1. The manner in which the signals are combined in computer 2 will be described below in relation to FIG. 2 which is a principal embodiment of the invention.

In order to more fully understand the device of this invention, reference will now be made to the theory and mathematical terms utilized in computer 2 to provide the desired correction signal to velocity meter 1 in FIG. 1. According to theory well known in the autonavigation art, an expression for the acceleration signal exciting an inertial accelerometer measuring vertical acceleration is the following in which terms of second and higher order in $$\left(\frac{h}{a_0}\right)$$

(1)
$$A_z = \ddot{h} + g_o - \frac{2g_o}{a_o}h + (\omega_x + \Omega_x)V_y - (\omega_y + \Omega_y)V_x + a_o\dot{\omega}\phi$$

where $A_z$ is the acceleration sensed by the instrument oriented along the plumb-bob vertical, $h$ is the computed acceleration, $a_o$ is the mean radius of the earth, $g_o$ is the reaction to the plumb-bob gravitational acceleration at the earth's surface, $h$ is the altitude of the aircraft above mean sea level, $V_x$, $V_y$ are the components of the aircraft velocity with respect to the earth expressed in platform coordinates, $\omega$ is the angular velocity of the center of gravity of the aircraft in inertial space, $\omega_x$ and $\omega_y$ the components thereof in platform coordinates, $\Omega_x$, $\Omega_y$ are the components in platform coordinates of the earth's angular velocity in inertial space, and $\phi$ is the angular displacement of the stabilized platform from the chosen vertical. For simplicity sake $F_z$ is made equivalent to the terms $(\omega_x + \Omega_x) V_y - (\omega_y + \Omega_y) V_x$. The expression $a_o\omega\phi$ may be neglected because of its effect on the system, thus leaving the equation:

(2)
$$A_z = \ddot{h} + g_o - \frac{2g_o}{a_o}h + F_z$$

Thus it is readily apparent that in an inertial accelerometer measuring vertical acceleration, a feedback system may be provided wherein the term $$\frac{2g_o}{a_o}$$

is fed back from the output of the accelerometer to its input to provide a closed loop servo system. The term $g_o$ is a known constant and the term $F_z$ may be obtained from information from the autonavigator. The system described thus far is unstabilized in that errors inherent in the servo system result in cumulative output errors which increased without bound.

The transient errors inherent in an inertial vertical acceleration measuring instrument such as contemplated in this invention are due primarily to: changes in the plumb-bob gravitational acceleration at the earth's surface represented as $g_o$, such as the variation in $g_o$ with latitude; horizontal components of acceleration sensed by the vertical velocity meter when the stabilized platform is out of alignment. Because the magnitude of these errors increases with time, the system is unstable. To alleviate this inherent instability some means independent of the vertical velocity meter must be used as a reference to provide corrections to the system.

Figure 2:
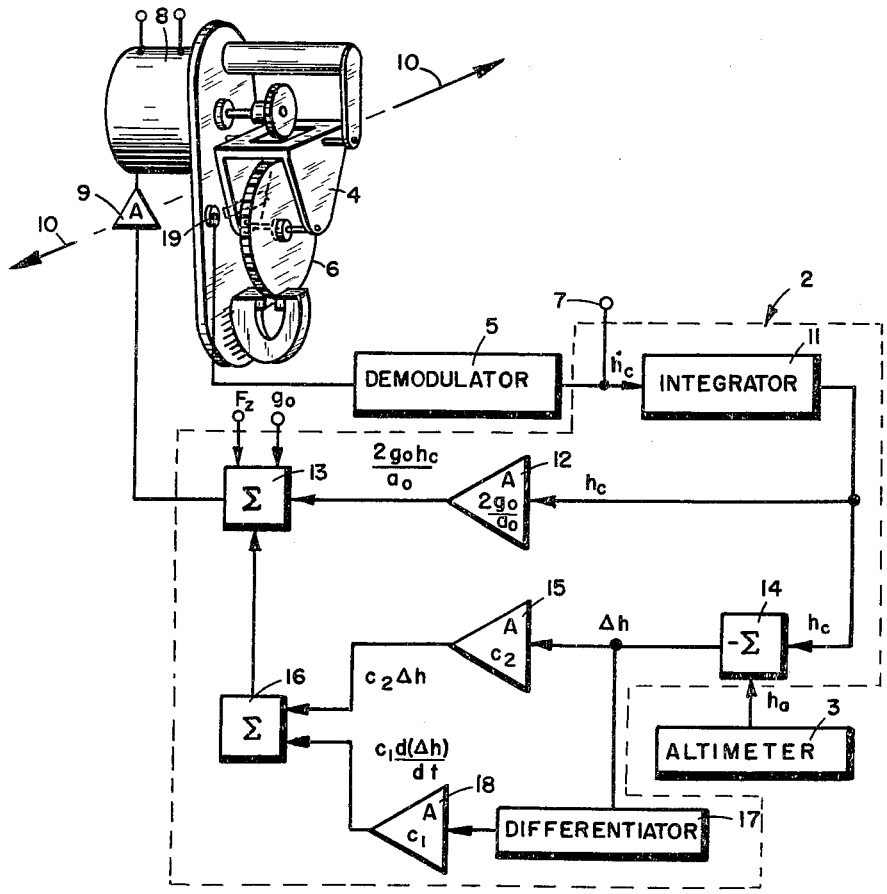
FIG. 2 is a schematic wiring diagram of an embodiment illustrating the principles of the invention.

Accordingly, there is shown in FIG. 2 an analog mechanization of computer 2 of FIG. 1 and vertical velocity meter 1 which together with altimeter 3 provide a means independent of the vertical velocity meter for providing corrections to velocity meter 1. Velocity meter 1 may be of any type of inertial accelerometer or velocity meter adapted to be mounted on a stabilized platform of an aircraft guidance system. If an accelerometer is used, an additional stage of integration will be provided in the computer. The embodiment illustrated in FIG. 2 utilizes the vertical velocity meter described in co-pending application to Doyle E. Wilcox, Serial No. 615,629, entitled Induction Velocity Meter, now Patent No. 2,964,949. The velocity meter shown includes a pendulously mounted cradle 4 which carries a rotatable member 6 taking the form of an induction disc torquer. Motor 8 responsive to amplifier 9 is provided for applying a rotating force to disc 6. The deflection of cradle 4 is proportional to the force of acceleration acting thereon along sensitive axis 10. Pickoff means 19 measures this acceleration and provides an acceleration signal to demodulator 5 which provides an output signal proportional to velocity. Amplifier 9 responsive to a torquing correction signal from computer 2 provides a signal to motor 8 which tends to drive cradle 4 to a null position. A detailed description of velocity meter 1 may be obtained from the above mentioned co-pending application.

As indicated in FIG. 2, computer 2 may comprise a number of conventional computing circuits connected as illustrated. The output of demodulator 5 is proportional to the vertical velocity of the aircraft as determined by velocity meter 1 and corrected by computer 2. The vertical velocity signal $\dot{h}_c$ is integrated in integrator 11 to provide altitude signal $h_c$. Altitude signal $h_c$ is multiplied in amplifier 12 by the constant quantity $$2\frac{g_o}{a_o}$$

to obtain the signal $$2\frac{g_o}{a_o}h_c$$

which forms one of the inputs to summing network 13. The altitude signal $h_c$ is also fed to summing network 14 together with altitude signal $h_a$ which is a signal provided by altimeter 3 proportional to the altitude of the aircraft as determined by altimeter 3. Summing network 14 provides the difference of the inputs $h_c$ and $h_a$ which is the difference altitude signal $\Delta h$. Difference altitude signal $\Delta h$ is multiplied in amplifier 15 by the constant $C_2$. The output of amplifier 15, which is the signal $C_2\Delta h$, forms one of the inputs to summing network 16. Difference altitude signal $\Delta h$ is also fed to differentiator 17 which produces the signal $$\frac{\alpha(\Delta h)}{dt}$$

at its output. The signal $$\frac{\alpha(\Delta h)}{dt}$$

is multiplied in amplifier 18 by the constant $C_1$. The output of multiplier 18 which is the signal $$\frac{C_1\alpha(\Delta h)}{dt}$$

is fed to summing network 16 together with the signal $C_2\Delta h$. The output of summing network 16 which is the signal $$\frac{C_{1\alpha(\Delta h)}}{dt} + C_2\Delta h$$

is fed to the summing network 13 along with the $$2\frac{g_o}{a_o}h_c$$

signal from amplifier 12, and the $F_z$ and $-g_o$ signals which are received from associated computer circuitry not a part of this invention. Summing network 13 sums these signals and provides a correctional signal to amplifier 9 which is the signal $$-F_z - g_o + 2\frac{g_o}{a_o}h_c + C_2\Delta h + \frac{C_{1\alpha(\Delta h)}}{dt}$$

The computed quantity $$2\frac{g_o}{a_o}h_c$$

cancels the corresponding term in Equation 1 and thus provides the feedback loop in the system. The quantity $g_0$ is a known constant and $F_z$ is obtained from available aircraft instruments. The quantities $C_2\Delta h$ and $$\frac{C_{1a(\Delta h)}}{dt}$$

which are derived from both the output of the velocity meter and altimeter 3 are acceleration correction signals applied at the input of velocity meter 1 in order to provide a stabilized vertical velocity signal at the output of velocity meter 1. The quantity $C_2\Delta h$ provides an error control signal directly proportional to the difference between the altitude signal $h_c$ from velocity meter 1 and altitude signal $h_a$ from altimeter 3. The value of constant $C_2$ is determined in accordance with test results achieved in testing each particular system. The quantity $$\frac{C_{1a(\Delta h)}}{dt}$$

provides a differential error control signal proportional to the first derivative of the difference altimeter signal $\Delta h$. Constant $C_1$ is determined in a manner similar to that described for $C_2$. By providing both the proportional control error signal $C_2\Delta h$ and the differential control signal $$\frac{C_{1a(\Delta h)}}{dt}$$

a more stabilized and accurate system is provided than would exist if only a signal proportional to $\Delta h$ were used.

It is to be understood that the embodiment described and shown in FIG. 2 is but one of many possible mechanizations of the invention. Either an accelerometer or a velocity meter may be used, and either analogue or digital computer mechanizations using circuitry, well known in the computer art, may be utilized as required for particular systems.

Although this invention has been described and illustrated in detail, it is to be clearly understood that the same is by way of illustration and example only and is not to be taken by way of limitation, the spirit and scope of this invention being limited only by the terms of the appended claims.

We claim:

1. In an inertial instrument for measuring the vertical velocity component of an aircraft, an accelerometer having a vertical sensing axis and providing an output signal, means for integrating said output signal to obtain a first altitude signal, an altimeter for obtaining a second altitude signal, means for obtaining a signal proportional to the difference between said first and second altitude signals, means providing a signal proportional to the derivative of said difference signal, and means responsive to said first altitude signal and said derivative signal to provide a correction signal to said accelerometer.

2. The combination in claim 1 wherein said last mentioned means comprise means for providing a signal proportional to said first altitude signal times a first predetermined constant, means for producing a signal proportional to said derivative signal times a second predetermined constant, means for producing a signal proportional to said difference signal times a third predetermined constant, and means for summing said signals.

3. In a stabilized inertial instrument for measuring the vertical velocity component of an aircraft and having a support means mounted on a first pivot axis, a rotatable member journalled in said support means on a second pivot axis spaced from said first axis, a means for detecting deflection of said support means about said first axis to provide an output signal. and feedback means including said member and responsive to said detecting means for torquing said support means in a sense to decrease said detected deflection, the improvement comprising; means for integrating the output of said deflection detecting means to obtain a first altitude signal, an altimeter for obtaining a second altitude signal, and means responsive to said first and second altitude signals to provide a correction signal to said torquing means.

4. In combination a stabilized inertial instrument having a vertical sensitive axis and comprising a support adapted to be mounted on said sensitive axis, a mass pivoted to said support about a pivot axis normal to said sensitive axis, a pickoff mounted between said mass and said support and having an output indicative of the angular relation therebetween, means for integrating the output of said pickoff, an altimeter for measuring the altitude of said instrument, and means for torquing said mass about said pivot axis in response to both the output of said integrating means and the output of said altimeter.

5. For use with a stabilized inertial vertical velocity measuring instrument having a vertical sensing axis and having a support, a mass mounted to said support for motion about a pivot axis, detecting means and a feedback loop having a signal for torquing said mass in accordance with motion of said mass about said pivot axis in a sense to decrease said motion, apparatus for carrying said feedback loop signal comprising means for integrating the output of said detecting means to obtain a first altitude signal, an altimeter for obtaining a second altitude signal, and means responsive to said first and second altitude signals to provide a correction signal to said torquing means.

6. The device of claim 3 wherein said last mentioned means comprise means for obtaining a signal proportional to the difference between said first and second altitude signals, means providing a signal proportional to the derivative of said difference signal, means for producing a first correction signal proportional to said first altitude signal times a constant determined by the earth's gravitational effect, means for producing a second correctional signal proportional to said derivative signal times a constant, and means for producing a third corrective signal proportional to said difference signal times a constant.

7. In a stabilized inertial accelerometer for measuring the vertical velocity of an object, the combination of means responsive to the output signal of said accelerometer for obtaining a first altitude signal, an altimeter for obtaining a second altitude signal, and means responsive to said first and second altitude signals to provide a correction signal to said accelerometer, said means comprising means for providing a signal indicating the difference between said first and second altitude signals, means for providing a signal indicating the derivative of said difference signal, and means for combining said two immediately previous signals with said first altitude signal.

8. Means for measuring the vertical velocity of an object, comprising: an inertial accelerometer whose sensitive axis is stabilized to a vertical direction and adapted to generate an output signal; means responsive to signals generated by said accelerometer to create a first altitude signal; an altimeter for generating a second altitude signal; means responsive to said first and second altitude signals to generate a signal which is a measure of the difference between said altitude signals; means connected to generate a signal proportional to the derivative of said difference signal; means connected to generate a first correction signal proportional to said first altitude signal times a constant determined by the earth's gravitational effect; means connected to generate a second correction signal proportional to said derivative siganl times a constant; and means connected to generate a third correction signal proportional to said difference signal times a constant; said first, second, and third correctional signals being connected to bias said accelerometer.

References Cited in the file of this patent

UNITED STATES PATENTS

| | | |
|---|---|---|
| 2,443,748 | Sanders et al. | June 22, 1948 |
| 2,856,772 | Strihafka | Oct. 21, 1958 |

UNITED STATES PATENT OFFICE
CERTIFICATE OF CORRECTION

Patent No. 3,005,348                                October 24, 1961

Kenneth L. Perkins et al.

It is hereby certified that error appears in the above numbered patent requiring correction and that the said Letters Patent should read as corrected below.

Column 2, line 19, for "producting" read -- producing --; line 32, after "inertial" insert -- vertical --; column 3, lines 3 to 5, after "$(\frac{h}{a_o})$" insert -- have been neglected. --; line 25, for "$a_o \omega \phi$" read -- $a_o \dot{\omega} \phi$ --; in all equations where the term "$\alpha$" appears, this term should be changed to -- d --; column 6, line 65, for "siganl" read -- signal --.

Signed and sealed this 14th day of August 1962.

(SEAL)
Attest:
ERNEST W. SWIDER
Attesting Officer

DAVID L. LADD
Commissioner of Patents